US007574008B2

(12) United States Patent
Zhang et al.

(10) Patent No.: US 7,574,008 B2
(45) Date of Patent: Aug. 11, 2009

(54) METHOD AND APPARATUS FOR MULTI-SENSORY SPEECH ENHANCEMENT

(75) Inventors: Zhengyou Zhang, Bellevue, WA (US); Alejandro Acero, Bellevue, WA (US); James G. Droppo, Duvall, WA (US); Xuedong David Huang, Bellevue, WA (US); Zicheng Liu, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 878 days.

(21) Appl. No.: 10/944,235

(22) Filed: Sep. 17, 2004

(65) Prior Publication Data

US 2006/0072767 A1 Apr. 6, 2006

(51) Int. Cl.
*H04B 15/00* (2006.01)

(52) U.S. Cl. ..................... 381/94.7; 381/94.1; 704/233; 704/226

(58) Field of Classification Search ..... 381/71.1–71.14, 381/94.1–94.9, 122, 92; 704/233, 208, 226; 700/94
See application file for complete search history.

(56) References Cited

U.S. PATENT DOCUMENTS

| | | | | |
|---|---|---|---|---|
| 3,383,466 | A | 5/1968 | Hilix et al. | 179/1 |
| 3,746,789 | A | 7/1973 | Alciver | 179/1 |
| 3,787,641 | A | 1/1974 | Santori | 179/107 |
| 4,382,164 | A | 5/1983 | May, Jr. | 704/233 |
| 4,769,845 | A | 9/1988 | Nakamura | 704/231 |
| 5,054,079 | A | 10/1991 | Frielingsdorf et al. | 381/151 |
| 5,151,944 | A | 9/1992 | Yamamura | 381/151 |
| 5,197,091 | A | 3/1993 | Takagi et al. | 379/433.12 |
| 5,241,692 | A * | 8/1993 | Harrison et al. | 455/79 |
| 5,295,193 | A | 3/1994 | Ono | 381/151 |
| 5,404,577 | A | 4/1995 | Zuckerman et al. | 455/66 |
| 5,446,789 | A | 8/1995 | Loy et al. | |
| 5,555,449 | A | 9/1996 | Kim | 379/433.03 |
| 5,590,241 | A * | 12/1996 | Park et al. | 704/227 |
| 5,647,834 | A | 7/1997 | Ron | 600/23 |
| 5,692,059 | A | 11/1997 | Kruger | 381/151 |
| 5,701,390 | A | 12/1997 | Griffin et al. | 704/206 |
| 5,757,934 | A | 5/1998 | Yokoi | 381/68.3 |
| 5,812,970 | A | 9/1998 | Chan et al. | 704/226 |
| 5,828,768 | A | 10/1998 | Eatwell et al. | 381/333 |
| 5,873,728 | A | 2/1999 | Jeong | 434/185 |

(Continued)

FOREIGN PATENT DOCUMENTS

| | | |
|---|---|---|
| DE | 199 17 169 | 11/2000 |

(Continued)

OTHER PUBLICATIONS

U.S. Appl. No. 11/156,434, filed Jun. 20, 2005, Zicheng et al.

(Continued)

*Primary Examiner*—Vivian Chin
*Assistant Examiner*—Fatimat O Olaniran
(74) *Attorney, Agent, or Firm*—Theodore M. Magee; Westman, Champlin & Kelly, P.A.

(57) ABSTRACT

A method and apparatus determine a channel response for an alternative sensor using an alternative sensor signal and an air conduction microphone signal. The channel response is then used to estimate a clean speech value using at least a portion of the alternative sensor signal.

13 Claims, 7 Drawing Sheets

U.S. PATENT DOCUMENTS

| | | | | |
|---|---|---|---|---|
| 5,933,506 | A | 8/1999 | Aoki et al. | 381/151 |
| 5,943,627 | A | 8/1999 | Kim et al. | 379/426 |
| 5,983,073 | A | 11/1999 | Ditzik | 455/11.1 |
| 5,983,186 | A | 11/1999 | Miyazawa et al. | 704/275 |
| 6,006,175 | A | 12/1999 | Holzrichter | 704/208 |
| 6,028,556 | A | 2/2000 | Shiraki | 343/702 |
| 6,052,464 | A | 4/2000 | Harris et al. | 379/433 |
| 6,052,567 | A | 4/2000 | Ito et al. | 455/90 |
| 6,091,972 | A | 7/2000 | Ogasawara | 455/575.7 |
| 6,094,492 | A | 7/2000 | Boesen | 381/312 |
| 6,125,284 | A | 9/2000 | Moore et al. | 455/557 |
| 6,137,883 | A | 10/2000 | Kaschke et al. | 379/433.07 |
| 6,151,397 | A | 11/2000 | Jackson et al. | 381/71.4 |
| 6,175,633 | B1 | 1/2001 | Morrill et al. | 381/71.6 |
| 6,243,596 | B1 | 6/2001 | Kikinis | 429/8 |
| 6,266,422 | B1 | 7/2001 | Ikeda | 381/71.11 |
| 6,289,309 | B1 * | 9/2001 | deVries | 704/233 |
| 6,292,674 | B1 | 9/2001 | Davis | 455/550.1 |
| 6,308,062 | B1 | 10/2001 | Chien et al. | 455/420 |
| 6,339,706 | B1 | 1/2002 | Tillgren et al. | 455/419 |
| 6,343,269 | B1 | 1/2002 | Harada et al. | 704/243 |
| 6,377,919 | B1 | 4/2002 | Burnett et al. | 704/231 |
| 6,389,391 | B1 | 5/2002 | Terauchi | 704/233 |
| 6,408,081 | B1 | 6/2002 | Boesen | 381/312 |
| 6,411,933 | B1 | 6/2002 | Maes et al. | 704/273 |
| 6,434,239 | B1 | 8/2002 | DeLuca | 381/71.2 |
| 6,542,721 | B2 | 4/2003 | Boesen | 455/90 |
| 6,560,468 | B1 | 5/2003 | Boesen | 455/568 |
| 6,590,651 | B1 | 7/2003 | Bambot et al. | 356/338 |
| 6,594,629 | B1 | 7/2003 | Basu et al. | 704/251 |
| 6,664,713 | B2 | 12/2003 | Boesen | 310/328 |
| 6,675,027 | B1 | 1/2004 | Huang | 455/575 |
| 6,707,921 | B2 | 3/2004 | Moore | 381/327 |
| 6,711,539 | B2 * | 3/2004 | Burnett et al. | 704/223 |
| 6,717,991 | B1 | 4/2004 | Gustafsson et al. | 375/285 |
| 6,738,485 | B1 | 5/2004 | Boesen | 381/312 |
| 6,754,358 | B1 | 6/2004 | Boesen et al. | 381/326 |
| 6,754,623 | B2 * | 6/2004 | Deligne et al. | 704/233 |
| 6,760,600 | B2 | 7/2004 | Nickum | 455/557 |
| 6,879,952 | B2 * | 4/2005 | Acero et al. | 704/222 |
| 6,959,276 | B2 | 10/2005 | Droppo et al. | 704/226 |
| 7,054,423 | B2 | 5/2006 | Nebiker et al. | 379/201.01 |
| 7,110,944 | B2 | 9/2006 | Balan et al. | 704/226 |
| 7,117,148 | B2 | 10/2006 | Droppo et al. | 704/228 |
| 7,181,390 | B2 | 2/2007 | Droppo et al. | 704/226 |
| 7,190,797 | B1 | 3/2007 | Johnston et al. | 381/74 |
| 7,246,058 | B2 * | 7/2007 | Burnett | 704/226 |
| 2001/0027121 | A1 | 10/2001 | Boesen | 455/556 |
| 2001/0037195 | A1 | 11/2001 | Acero et al. | 704/200 |
| 2001/0039195 | A1 | 11/2001 | Nickum | 455/557 |
| 2001/0044318 | A1 | 11/2001 | Mantyjarvi et al. | 455/550 |
| 2002/0039425 | A1 * | 4/2002 | Burnett et al. | 381/94.7 |
| 2002/0057810 | A1 | 5/2002 | Boesen | |
| 2002/0068537 | A1 | 6/2002 | Shim et al. | 455/177.1 |
| 2002/0075306 | A1 | 6/2002 | Thompson et al. | |
| 2002/0114472 | A1 | 8/2002 | Lee et al. | 381/71.12 |
| 2002/0118852 | A1 | 8/2002 | Boesen | 381/328 |
| 2002/0173953 | A1 | 11/2002 | Frey et al. | 704/226 |
| 2002/0181669 | A1 | 12/2002 | Takatori et al. | |
| 2002/0196955 | A1 | 12/2002 | Boesen | |
| 2002/0198021 | A1 | 12/2002 | Boesen | 455/556 |
| 2003/0061037 | A1 | 3/2003 | Droppo et al. | 704/226 |
| 2003/0083112 | A1 | 5/2003 | Fukuda | 455/568 |
| 2003/0097254 | A1 | 5/2003 | Holzrichter et al. | 704/201 |
| 2003/0125081 | A1 | 7/2003 | Boesen | 455/556 |
| 2003/0128848 | A1 * | 7/2003 | Burnett | 381/71.8 |
| 2003/0144844 | A1 | 7/2003 | Colmenarez et al. | 704/273 |
| 2003/0179888 | A1 | 9/2003 | Burnett et al. | 381/71.8 |
| 2004/0028154 | A1 | 2/2004 | Yellin et al. | 375/341 |
| 2004/0086137 | A1 | 5/2004 | Yu et al. | 381/71.11 |
| 2004/0092297 | A1 | 5/2004 | Huang | |
| 2004/0186710 | A1 | 9/2004 | Yang | 704/226 |
| 2004/0249633 | A1 | 12/2004 | Asseily et al. | 704/200 |
| 2005/0038659 | A1 | 2/2005 | Helbing | 704/271 |
| 2005/0114124 | A1 | 5/2005 | Liu et al. | |
| 2006/0008256 | A1 | 1/2006 | Khedouri et al. | 386/124 |
| 2006/0009156 | A1 | 1/2006 | Hayes et al. | 455/63.1 |
| 2006/0072767 | A1 | 4/2006 | Zhang et al. | 381/71.6 |
| 2006/0079291 | A1 | 4/2006 | Granovetter et al. | 455/563 |

FOREIGN PATENT DOCUMENTS

| | | | |
|---|---|---|---|
| EP | 0 720 338 | A2 | 7/1996 |
| EP | 742 678 | | 11/1996 |
| EP | 0 854 535 | A2 | 7/1998 |
| EP | 0 939 534 | A1 | 9/1999 |
| EP | 0 951 883 | | 10/1999 |
| EP | 1 333 650 | | 8/2003 |
| EP | 1 569 422 | | 8/2005 |
| FR | 2 761 800 | | 4/1997 |
| GB | 2 375 276 | | 11/2002 |
| GB | 2 390 264 | | 12/2003 |
| JP | 3108997 | | 5/1991 |
| JP | 4245720 | | 9/1992 |
| JP | 5276587 | | 10/1993 |
| JP | 8065781 | | 3/1996 |
| JP | 8070344 | | 3/1996 |
| JP | 8079868 | | 3/1996 |
| JP | 8214391 | | 8/1996 |
| JP | 9284877 | | 10/1997 |
| JP | 10-023122 | | 1/1998 |
| JP | 10-023123 | | 1/1998 |
| JP | 11265199 | | 9/1999 |
| JP | 2001119797 | | 10/1999 |
| JP | 2001245397 | | 2/2000 |
| JP | 20002-09688 | | 7/2000 |
| JP | 2000196723 | | 7/2000 |
| JP | 2000250577 | | 9/2000 |
| JP | 2000261529 | | 9/2000 |
| JP | 2000261530 | | 9/2000 |
| JP | 2000261534 | | 9/2000 |
| JP | 2000354284 | | 12/2000 |
| JP | 20012924989 | | 10/2001 |
| JP | 2002-125298 | | 4/2002 |
| JP | 2002-358089 | | 12/2002 |
| JP | 2003143253 | | 5/2003 |
| WO | WO 93/01664 | | 1/1993 |
| WO | WO 95/17746 | | 6/1995 |
| WO | WO 00/21194 | | 10/1998 |
| WO | WO 99/04500 | | 1/1999 |
| WO | WO 2000/021194 | | 4/2000 |
| WO | WO 00/45248 | | 8/2000 |
| WO | WO 2002/007477 | | 1/2002 |
| WO | WO 02/077972 | A1 | 3/2002 |
| WO | WO 02/098169 | A1 | 12/2002 |
| WO | WO 03/055270 | A1 | 3/2003 |
| WO | WO 2004/012477 | | 5/2004 |

OTHER PUBLICATIONS

Australian Search Report and Written Opinion for Foreign Application No. SG 200500289-4 filed Jan. 18, 2005.

RD 418033, Feb. 10, 1999.

Office Action in foreign application No. PA/a/2005/002133 filed Feb. 23, 2005.

European Search report from Application No. 05101071.8, filed Feb. 14, 2005.

U.S. Appl. No. 10/629,278, filed Jul. 29, 2003, Huang et al.

U.S. Appl. No. 10/785,768, filed Feb. 24, 2004, Sinclair et al.

U.S. Appl. No. 10/636,176, filed Aug. 7, 2003, Huang et al.

Zheng Y. et al., "Air and Bone-Conductive Integrated Microphones for Robust Speech Detection and Enhancement" Automatic Speech Recognition and Understanding 2003. pp. 249-254.

De Cuetos P. et al. "Audio-visual intent-to-speak detection for human-computer interaction" vol. 6, Jun. 5, 2000. pp. 2373-2376.

M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.

P. Heracleous, Y. Nakajima, A. Lee, H. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.

O.M. Strand, T. Holter, A. Egeberg, and S. Stensby, "On the Feasibility of ASR in Extreme Noise Using the PARAT Earplug Communication Terminal," ASRU 2003, St. Thomas, U.S. Virgin Islands, Nov. 20-Dec. 4, 2003.

Z. Zhang, Z. Liu, M. Sinclair, A. Acero, L. Deng, J. Droppo, X. D. Huang, Y. Zheng, "Multi-Sensory Microphones For Robust Speech Detection, Enchantment, and Recognition," ICASSP 04, Montreal, May 17-21, 2004.

European Search Report from Appln No. 05107921.8, filed Aug. 30, 2005.

http://www.snaptrack.com/ (2004).

http://www.misumi.com.tw/PLIST.ASP?PC.ID:21 (2004).

http://www.wherifywireless.com/univLoc.asp (2001).

http://www.wherifywireless.com/prod.watches.htm (2001).

Microsoft Office, Live Communications Server 2003, Microsoft Corporation, pp. 1-10, 2003.

Shoshana Berger, http://www.cnn.com/technology, "Wireless, wearable, and wondrous tech," Jan. 17, 2003.

http://www.3G.co.uk, "NTT DoCoMo to Introduce First Wireless GPS Handset," Mar. 27, 2003.

"Physiological Monitoring System 'Lifeguard' System Specifications," Stanford University Medical Center, National Biocomputation Center, Nov. 8, 2002.

Nagl, L., "Wearable Sensor System for Wireless State-of-Health Determination in Cattle," Annual International Conference of the Institute of Electrical and Electronics Engineers' Engineering in Medicine and Biology Society, 2003.

Asada, H. And Barbagelata, M., "Wireless Fingernail Sensor for Continuous Long Term Health Monitoring," MIT Home Automation and Healthcare Consortium, Phase 3, Progress Report No. 3-1, Apr. 2001.

Kumar, V., "The Design and Testing of a Personal Health System to Motivate Adherence to Intensive Diabetes Management," Harvard-MIT Division of Health Sciences and Technology, pp. 1-66, 2004.

Bakar, "The Insight of Wireless Communication," Research and Development, 2002, Student Conference on Jul. 16-17, 2002.

Search Report dated Dec. 17, 2004 from International Application No. 04016226.5.

European Search Report from Application No. 05108871.4, filed Sep. 26, 2005.

European Search report from Application No. 04025457.5, filed Oct. 26, 2004.

Written Opinion from Application No. SG 200500289-7, filed Jan. 18, 2005.

Chilean Office Action from Application No. 121-2005, filed Jan. 21, 2005.

First Office Action in corresponding foreign application No. 200510092458.5, filed Aug. 17, 2005.

* cited by examiner

METHOD AND APPARATUS FOR MULTI-SENSORY SPEECH ENHANCEMENT

BACKGROUND OF THE INVENTION

The present invention relates to noise reduction. In particular, the present invention relates to removing noise from speech signals.

A common problem in speech recognition and speech transmission is the corruption of the speech signal by additive noise. In particular, corruption due to the speech of another speaker has proven to be difficult to detect and/or correct.

Recently, a system has been developed that attempts to remove noise by using a combination of an alternative sensor, such as a bone conduction microphone, and an air conduction microphone. This system is trained using three training channels: a noisy alternative sensor training signal, a noisy air conduction microphone training signal, and a clean air conduction microphone training signal. Each of the signals is converted into a feature domain. The features for the noisy alternative sensor signal and the noisy air conduction microphone signal are combined into a single vector representing a noisy signal. The features for the clean air conduction microphone signal form a single clean vector. These vectors are then used to train a mapping between the noisy vectors and the clean vectors. Once trained, the mappings are applied to a noisy vector formed from a combination of a noisy alternative sensor test signal and a noisy air conduction microphone test signal. This mapping produces a clean signal vector.

This system is less than optimal when the noise conditions of the test signals do not match the noise conditions of the training signals because the mappings are designed for the noise conditions of the training signals.

SUMMARY OF THE INVENTION

A method and apparatus determine a channel response for an alternative sensor using an alternative sensor signal and an air conduction microphone signal. The channel response is then used to estimate a clean speech value using at least a portion of the alternative sensor signal.

DETAILED DESCRIPTION OF ILLUSTRATIVE EMBODIMENTS

Figure 1:
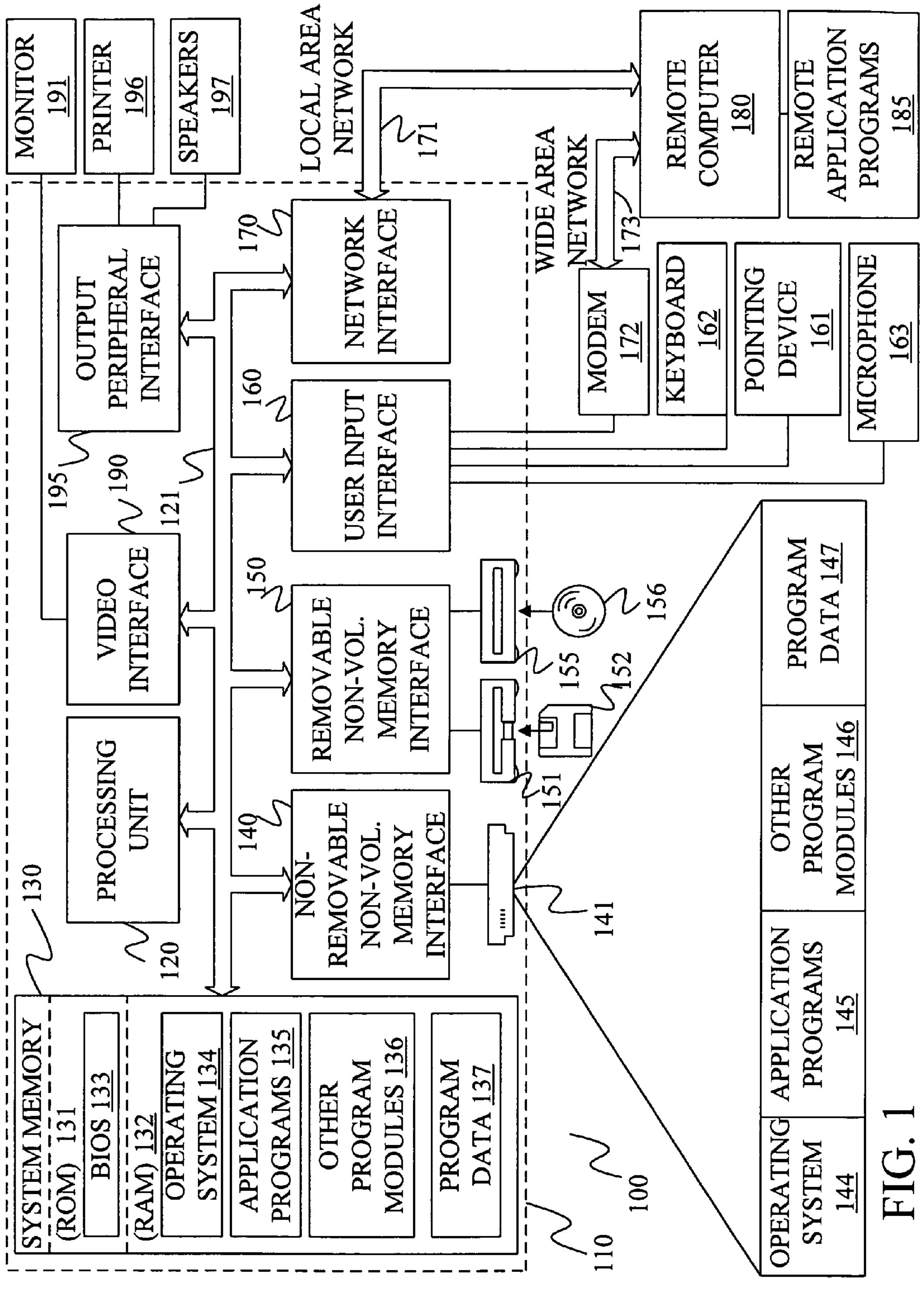
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
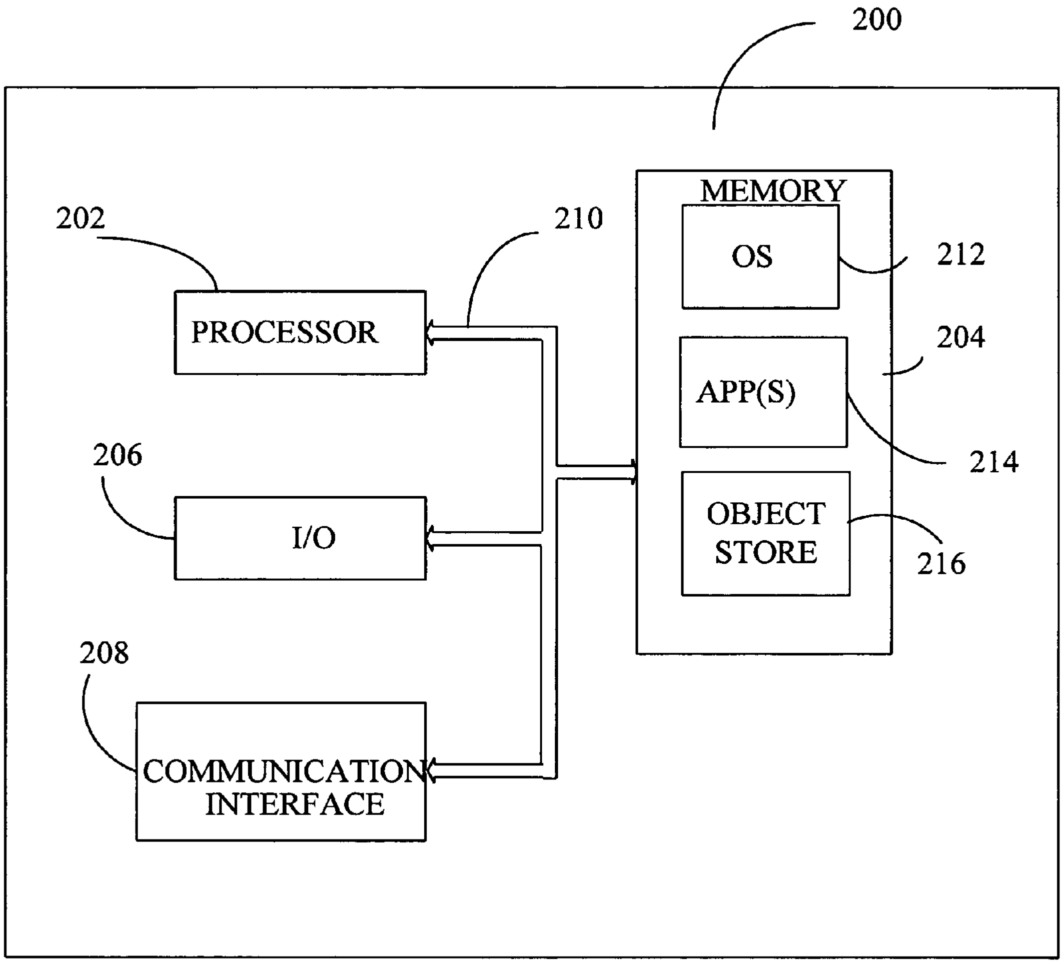
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
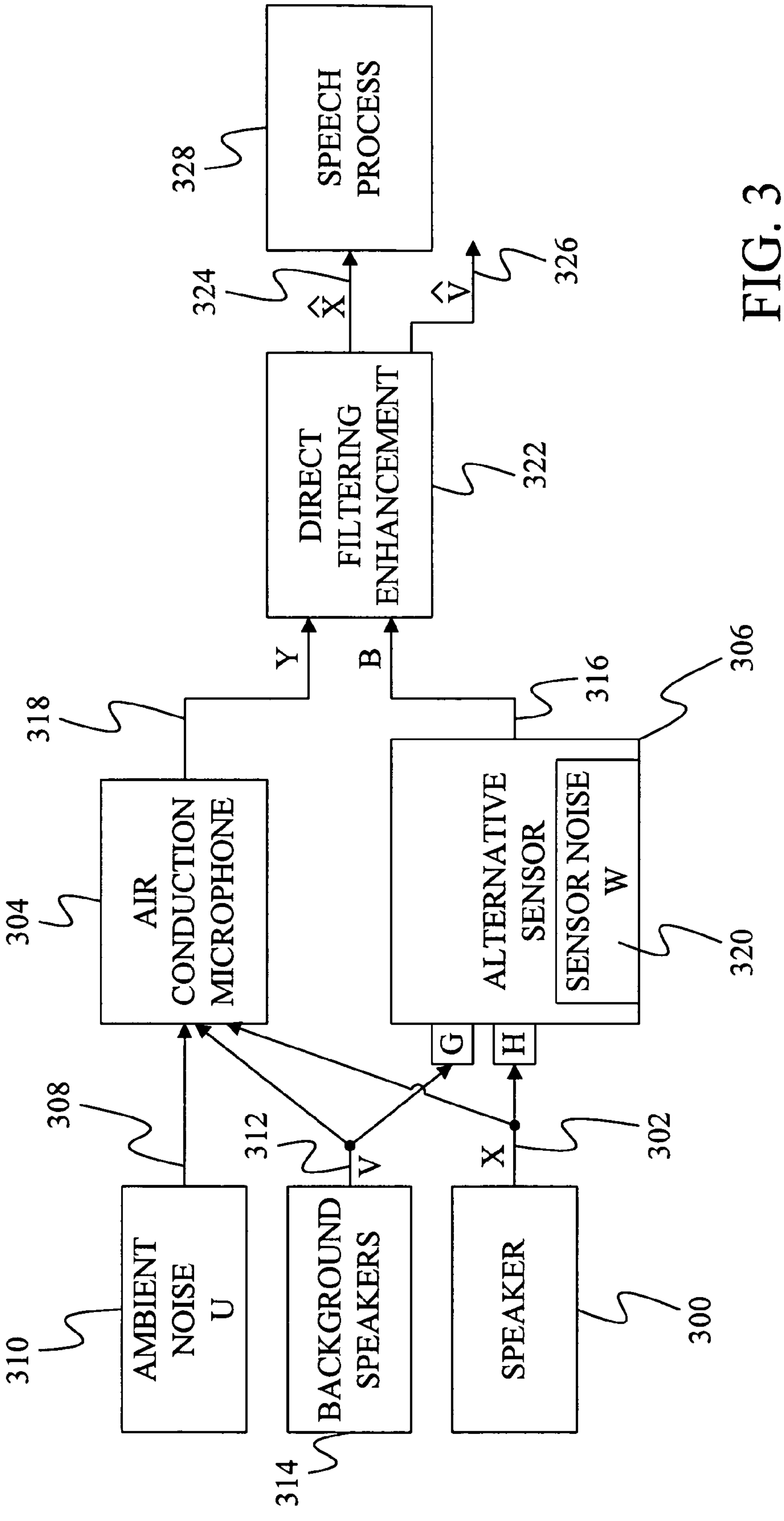
FIG. 3 is a block diagram of a general speech processing system of the present invention.

FIG. 3 provides a basic block diagram of embodiments of the present invention. In FIG. 3, a speaker 300 generates a speech signal 302 (X) that is detected by an air conduction microphone 304 and an alternative sensor 306. Examples of alternative sensors include a throat microphone that measures the user's throat vibrations, a bone conduction sensor that is located on or adjacent to a facial or skull bone of the user (such as the jaw bone) or in the ear of the user and that senses vibrations of the skull and jaw that correspond to speech generated by the user. Air conduction microphone 304 is the type of microphone that is used commonly to convert audio air-waves into electrical signals.

Air conduction microphone 304 also receives ambient noise 308 (U) generated by one or more noise sources 310 and background speech 312 (V) generated by background speaker(s) 314. Depending on the type of alternative sensor and the level of the background speech, background speech 312 may also be detected by alternative sensor 306. However, under embodiments of the present invention, alternative sensor 306 is typically less sensitive to ambient noise and background speech than air conduction microphone 304. Thus, the alternative sensor signal 316 (B) generated by alternative sensor 306 generally includes less noise than air conduction microphone signal 318 (Y) generated by air conduction microphone 304. Although alternative sensor 306 is less sensitive to ambient noise, it does generate some sensor noise 320 (W).

The path from speaker 300 to alternative sensor signal 316 can be modeled as a channel having a channel response H. The path from background speaker(s) 314 to alternative sensor signal 316 can be modeled as a channel have a channel response G.

Alternative sensor signal 316 (B) and air conduction microphone signal 318 (Y) are provided to a clean signal estimator 322, which estimates a clean signal 324 and in some embodiments, estimates a background speech signal 326. Clean signal estimate 324 is provided to a speech process 328. Clean signal estimate 324 may either be a filtered time-domain signal or a Fourier Transform vector. If clean signal estimate 324 is a time-domain signal, speech process 328 may take the form of a listener, a speech coding system, or a speech recognition system. If clean signal estimate 324 is a Fourier Transform vector, speech process 328 will typically be a speech recognition system, or contains an Inverse Fourier Transform to convert the Fourier Transform vector into waveforms.

Figure 4:
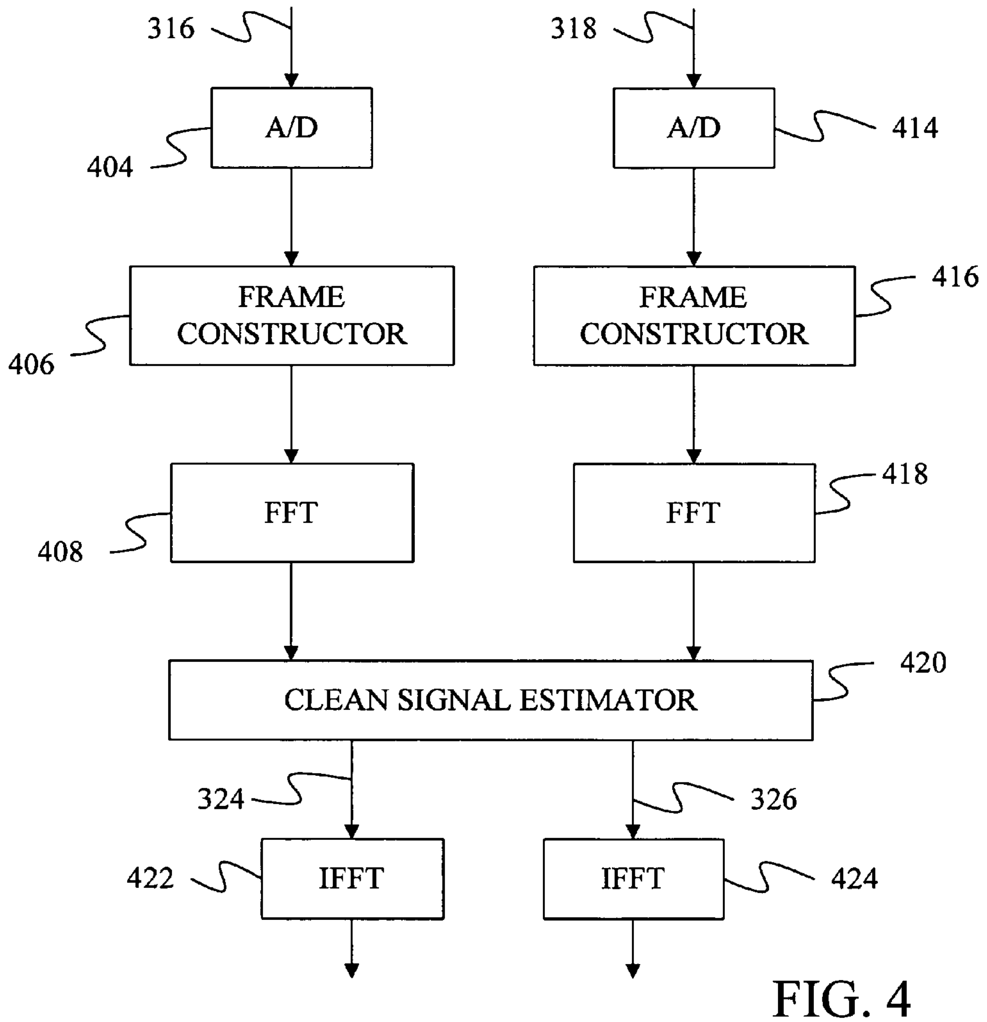
FIG. 4 is a block diagram of a system for enhancing speech one embodiment of the present invention.

Within direct filtering enhancement 322, alternative sensor signal 316 and microphone signal 318 are converted into the frequency domain being used to estimate the clean speech. As shown in FIG. 4, alternative sensor signal 316 and air conduction microphone signal 318 are provided to analog-to-digital converters 404 and 414, respectively, to generate a sequence of digital values, which are grouped into frames of values by frame constructors 406 and 416, respectively. In one embodiment, A-to-D converters 404 and 414 sample the analog signals at 16 kHz and 16 bits per sample, thereby creating 32 kilobytes of speech data per second and frame constructors 406 and 416 create a new respective frame every 10 milliseconds that includes 20 milliseconds worth of data.

Each respective frame of data provided by frame constructors 406 and 416 is converted into the frequency domain using Fast Fourier Transforms (FFT) 408 and 418, respectively.

The frequency domain values for the alternative sensor signal and the air conduction microphone signal are provided to clean signal estimator 420, which uses the frequency domain values to estimate clean speech signal 324 and in some embodiments background speech signal 326.

Under some embodiments, clean speech signal 324 and background speech signal 326 are converted back to the time domain using Inverse Fast Fourier Transforms 422 and 424. This creates time-domain versions of clean speech signal 324 and background speech signal 326.

The present invention provides direct filtering techniques for estimating clean speech signal 324. Under direct filtering, a maximum likelihood estimate of the channel response(s) for alternative sensor 306 are determined by minimizing a function relative to the channel response(s). These estimates are then used to determine a maximum likelihood estimate of the clean speech signal by minimizing a function relative to the clean speech signal.

Under one embodiment of the present invention, the channel response G corresponding to background speech being detected by the alternative sensor is considered to be zero and the background speech and ambient noise are combined to form a single noise term. This results in a model between the clean speech signal and the air conduction microphone signal and alternative sensor signal of:

$$y(t)=x(t)+z(t) \qquad \text{Eq. 1}$$

$$b(t)=h(t)*x(t)+w(t) \qquad \text{Eq. 2}$$

where y(t) is the air conduction microphone signal, b(t) is the alternative sensor signal, x(t) is the clean speech signal, z(t) is the combined noise signal that includes background speech and ambient noise, w(t) is the alternative sensor noise, and h(t) is the channel response to the clean speech signal associated with the alternative sensor. Thus, in Equation 2, the alternative sensor signal is modeled as a filtered version of the clean speech, where the filter has an impulse response of h(t).

In the frequency domain, Equations 1 and 2 can be expressed as:

$$Y_t(k)=X_t(k)+Z_t(k) \qquad \text{Eq. 3}$$

$$B_t(k)=H_t(k)X_t(k)+W_t(k) \qquad \text{Eq. 4}$$

where the notation $Y_t(k)$ represents the kth frequency component of a frame of a signal centered around time t. This notation applies to $X_t(k)$, $Z_t(k)$, $H_t(k)$, $W_t(k)$, and $B_t(k)$. In the discussion below, the reference to frequency component k is omitted for clarity. However, those skilled in the art will recognize that the computations performed below are performed on a per frequency component basis.

Under this embodiment, the real and imaginary parts of the noise $Z_t$ and $W_t$ are modeled as independent zero-mean Gaussians such that:

$$Z_t=N(O,\sigma_z^2) \qquad \text{Eq. 5}$$

$$W_t=N(O,\sigma_w^2) \qquad \text{Eq. 6}$$

where $\sigma_z^2$ is the variance for noise $Z_t$ and $\sigma_w^2$ is the variance for noise $W_t$.

$H_t$ is also modeled as a Gaussian such that $$H_t=N(H_0,\sigma_H^2) \qquad \text{Eq. 7}$$

where $H_0$ is the mean of the channel response and $\sigma_H^2$ is the variance of the channel response.

Given these model parameters, the probability of a clean speech value $X_t$ and a channel response value $H_t$ is described by the conditional probability:

$$p(X_t,H_t|Y_t,B_t,H_0\sigma_z^2,\sigma_w^2,\sigma_H^2) \qquad \text{Eq. 8}$$

which is proportional to:

$$p(Y_t,B_t|X_t,H_t,\sigma_z^2,\sigma_w^2)p(H_t|H_0,\sigma_H^2)p(X_t) \quad \text{Eq. 9}$$

which is equal to:

$$p(Y_t|X_t,\sigma_z^2)p(B_t|X_t,H_t,\sigma_w^2)p(H_t|H_0,\sigma_H^2)p(X_t) \quad \text{Eq. 10}$$

In one embodiment, the prior probability for the channel response, $p(H_t|H_0,\sigma_H^2)$, and the prior probability for the clean speech signal, $p(X_t)$, are ignored and the remaining probabilities are treated as Gaussian distributions. Using these simplifications, Equation 10 becomes:

$$\frac{1}{(2\pi)^2\sigma_z^2\sigma_w^2}\exp\left[-\frac{1}{2\sigma_z^2}|Y_t-X_t|^2-\frac{1}{2\sigma_w^2}|B_t-H_tX_t|^2\right] \quad \text{Eq. 11}$$

Thus, the maximum likelihood estimate of $H_t,X_t$ for an utterance is determined by minimizing the exponent term of Equation 11 across all time frames T in the utterance. Thus, the maximum likelihood estimate is given by minimizing:

$$F=\sum_{t=1}^{T}\left(\frac{1}{2\sigma_z^2}|Y_t-X_t|^2+\frac{1}{2\sigma_w^2}|B_t-H_tX_t|^2\right) \quad \text{Eq. 12}$$

Since Equation 12 is being minimized with respect to two variables, $X_t,H_t$, the partial derivative with respect to each variable may be taken to determine the value of that variable that minimizes the function. Specifically, $$\frac{\partial F}{\partial X_t}=0$$

gives:

$$X_t=\frac{1}{\sigma_w^2+\sigma_z^2|H_t|^2}(\sigma_w^2Y_t+\sigma_z^2H_t^*B_t) \quad \text{Eq. 13}$$

where $H_t^*$ represent the complex conjugate of $H_t$ and $|H_t|$ represents the magnitude of the complex value $H_t$.

Substituting this value of $X_t$ into Equation 12, setting the partial derivative $$\frac{\partial F}{\partial H_t}=0,$$

and then assuming that H is constant across all time frames T gives a solution for H of:

$$H=\frac{\sum_{t=1}^{T}(\sigma_z^2|B_t|^2-\sigma_w^2|Y_t|^2)\pm\sqrt{\left(\sum_{t=1}^{T}(\sigma_z^2|B_t|^2-\sigma_w^2|Y_t|^2)\right)^2+4\sigma_z^2\sigma_w^2\left|\sum_{t=1}^{T}B_t^*Y_t\right|^2}}{2\sigma_z^2\sum_{t=1}^{T}B_t^*Y_t} \quad \text{Eq. 14}$$

In Equation 14, the estimation of H requires computing several summations over the last T frames in the form of:

$$S(T)=\sum_{t=1}^{T}s_t \quad \text{Eq. 15}$$

where $s_t$ is $(\sigma_z^2|B_t|^2-\sigma_w^2|Y_t|^2)$ $\_\_$ or $B_t^{\cdot Y}{}_t$ With this formulation, the first frame (t=1) is as important as the last frame (t=T). However, in other embodiments it is preferred that the latest frames contribute more to the estimation of H than the older frames. One technique to achieve this is "exponential aging", in which the summations of Equation 15 are replaced with:

$$S(T)=\sum_{t=1}^{T}c^{T-t}s_t \quad \text{Eq. 16}$$

where $c\leqq 1$. If c=1, then Equation 16 is equivalent to Equation 15. If c<1, then the last frame is weighted by 1, the before-last frame is weighted by c (i.e., it contributes less than the last frame), and the first frame is weighted by $c^{T-1}$ (i.e., it contributes significantly less than the last frame). Take an example. Let c=0.99 and T=100, then the weight for the first frame is only 0.9999=0.37.

Under one embodiment, Equation 16 is estimated recursively as:

$$S(T)=cS'(T-1)+s_T \quad \text{Eq. 17}$$

Since Equation 17 automatically weights old data less, a fixed window length does not need to be used, and data of the last T frames do not need to be stored in the memory. Instead, only the value for S(T−1) at the previous frame needs to be stored.

Using Equation 17, Equation 14 becomes:

$$H_T=\frac{J(T)\pm\sqrt{(J(T))^2+4\sigma_z^2\sigma_w^2|K(T)|^2}}{2\sigma_z^2K(T)} \quad \text{Eq. 18}$$

where:

$$J(T)=cJ(T-1)+(\sigma_z^2|B_T|^2-\sigma_w^2|Y_T|^2) \quad \text{Eq. 19}$$

$$K(T)=cK(T-1)+B_T^{\cdot Y}{}_T \quad \text{Eq. 20}$$

The value of c in equations 19 and 20 provides an effective length for the number of past frames that are used to compute the current value of J(T) and K(T). Specifically, the effective length is given by:

$$L(T) = \sum_{t=1}^{T} c^{T-t} = \sum_{i=0}^{T-1} c^i = \frac{1 - c^T}{1 - c} \quad \text{Eq. 21}$$

The asymptotic effective length is given by:

$$L = \lim_{T \to \infty} L(T) = \frac{1}{1 - c} \quad \text{Eq. 22}$$

or equivalently, $$c = \frac{L - 1}{L} \quad \text{Eq. 23}$$

Thus, using equation 23, c can be set to achieve different effective lengths in equation 18. For example, to achieve an effective length of 200 frames, c is set as:

$$c = \frac{199}{200} = 0.995 \quad \text{Eq. 24}$$

Once H has been estimated using Equation 14, it may be used in place of all $H_t$ of Equation 13 to determine a separate value of $X_t$ at each time frame t. Alternatively, equation 18 may be used to estimate $H_t$ at each time frame t. The value of $H_t$ at each frame is then used in Equation 13 to determine $X_t$.

Figure 5:
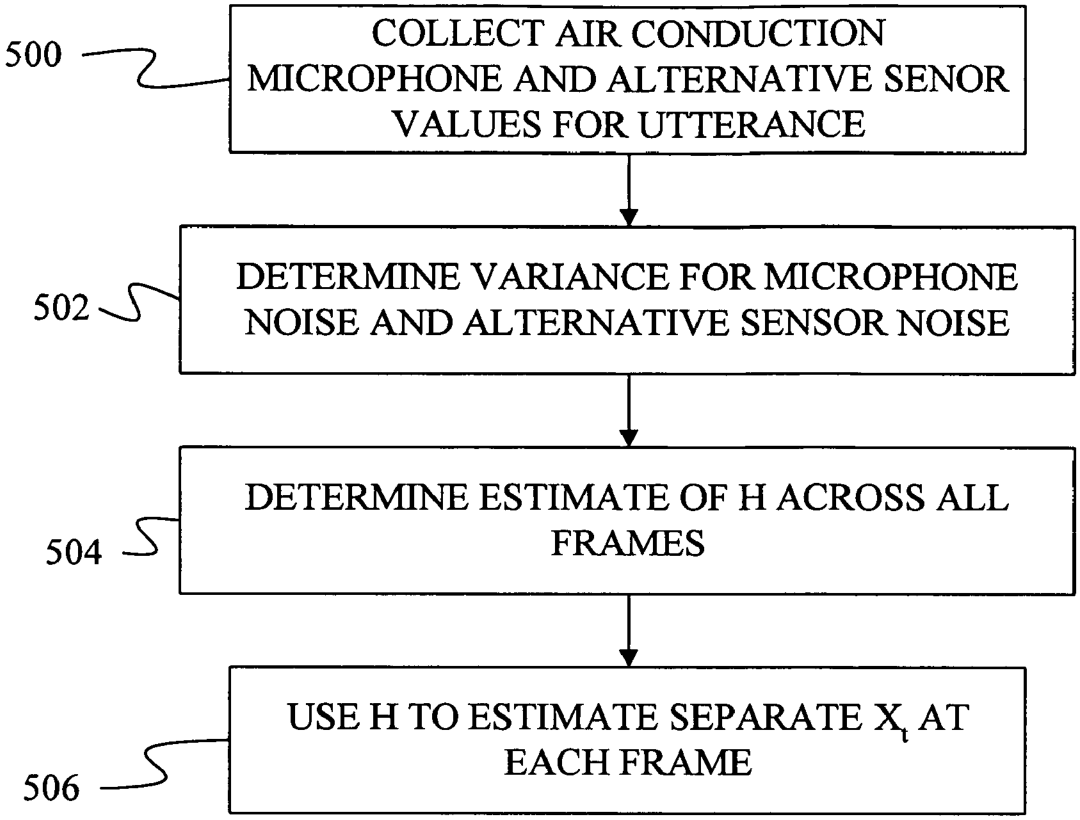
FIG. 5 is a flow diagram for enhancing speech under one embodiment of the present invention.

FIG. 5 provides a flow diagram of a method of the present invention that uses Equations 13 and 14 to estimate a clean speech value for an utterance.

At step 500, frequency components of the frames of the air conduction microphone signal and the alternative sensor signal are captured across the entire utterance.

At step 502 the variance for air conduction microphone noise $\sigma_z^2$ and the alternative sensor noise $\sigma_w^2$ is determined from frames of the air conduction microphone signal and alternative sensor signal, respectively, that are captured early in the utterance during periods when the speaker is not speaking.

The method determines when the speaker is not speaking by identifying low energy portions of the alternative sensor signal, since the energy of the alternative sensor noise is much smaller than the speech signal captured by the alternative sensor signal. In other embodiments, known speech detection techniques may be applied to the air conduction speech signal to identify when the speaker is speaking. During periods when the speaker is not considered to be speaking, $X_t$ is assumed to be zero and any signal from the air conduction microphone or the alternative sensor is considered to be noise. Samples of these noise values are collected from the frames of non-speech and are used to estimate the variance of the noise in the air conduction signal and the alternative sensor signal.

At step 504, the values for the alternative sensor signal and the air conduction microphone signal across all of the frames of the utterance are used to determine a value of H using Equation 14 above. At step 506, this value of H is used together with the individual values of the air conduction microphone signal and the alternative sensor signal at each time frame to determine an enhanced or noise-reduced speech value for each time frame using Equation 13 above.

In other embodiments, instead of using all of the frames of the utterance to determine a single value of H using Equation 14, $H_t$ is determined for each frame using Equation 18. The value of $H_t$ is then used to compute $X_t$ for the frame using Equation 13 above.

In a second embodiment of the present invention, the channel response of the alternative sensor to background speech is considered to be non-zero. In this embodiment, the air conduction microphone signal and the alternative sensor signal are modeled as:

$$Y_t(k) = X_t(k) + V_t(k) + U_t(k) \quad \text{Eq. 25}$$

$$B_t(k) = H_t(k)X_t(k) + G_t(k)V_t(k) + W_t(k) \quad \text{Eq. 26}$$

where noise $Z_t(k)$ has been separated into background speech $V_t(k)$ and ambient noise $U_t(k)$, and the alternative sensors channel response to the background speech is a non-zero value of $G_t(k)$.

Under this embodiment, the prior knowledge of the clean speech $X_t$ continues to be ignored. Making this assumption, the maximum likelihood for the clean speech $X_t$ can be found by minimizing the objective function:

$$F = \frac{1}{\sigma_w^2}|B_t - H_t X_t - G_t V_t|^2 + \frac{1}{\sigma_u^2}|Y_t - X_t - V_t|^2 + \frac{1}{\sigma_v^2}|V_t|^2 \quad \text{Eq. 27}$$

This results in an equation for the clean speech of:

$$X_t = \frac{(\sigma_w^2 + \sigma_u^2 H_t^* G_t)Y_t + [(\sigma_u^2 + \sigma_v^2)H_t^* - \sigma_v^2 G_t^*](B_t - G_t Y_t)}{\sigma_v^2|H_t - G_t|^2 + \sigma_w^2 + \sigma_u^2|H_t|^2}$$

Figure 6:
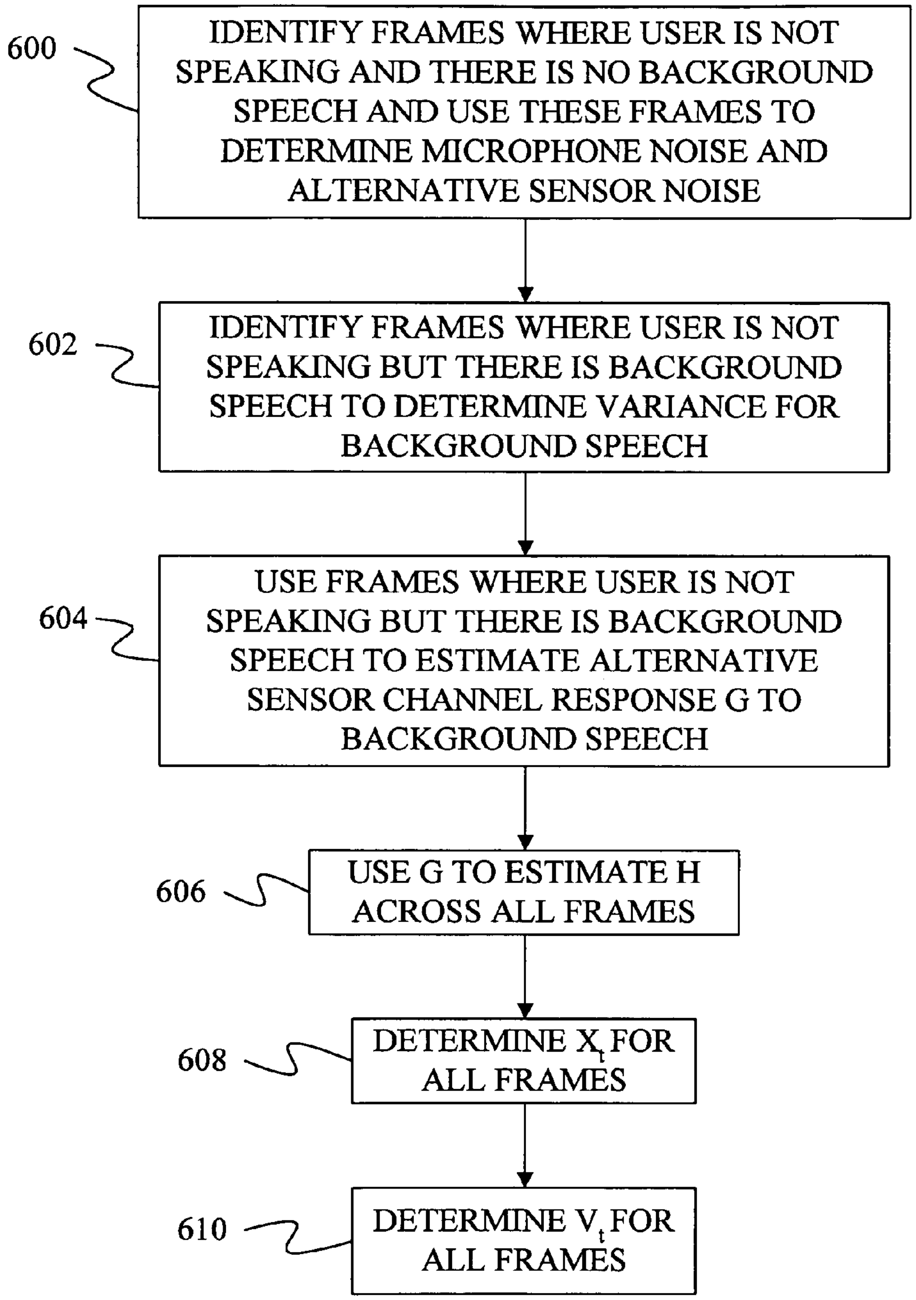
FIG. 6 is a flow diagram for enhancing speech under another embodiment of the present invention.

In order to solve Equation 28, the variances $\sigma_w^2$, $\sigma_u^2$ and $\sigma_v^2$ as well as the channel response values $H_t$ and $G_t$ must be known. FIG. 6 provides a flow diagram for identifying these values and for determining enhanced speech values for each frame.

In step 600, frames of the utterance are identified where the user is not speaking and there is no background speech. These frames are then used to determine the variance $\sigma_w^2$ and $\sigma_u^2$ for the alternative sensor and the air conduction microphone, respectively.

To identify frames where the user is not speaking, the alternative sensor signal can be examined. Since the alternative sensor signal will produce much smaller signal values for background speech than for noise, if the energy of the alternative sensor signal is low, it can be assumed that the speaker is not speaking. Within the frames identified based on the alternative signal, a speech detection algorithm can be applied to the air conduction microphone signal. This speech detection system will detect whether there is background speech present in the air conduction microphone signal when the user is not speaking. Such speech detection algorithms are well known in the art and include systems such as pitch tracking systems.

After the variances for the noise associated with the air conduction microphone and the alternative sensor have been determined, the method of FIG. 6 continues at step 602 where it identifies frames where the user is not speaking but there is background speech present. These frames are identified using the same technique described above but selecting those frames that include background speech when the user is not speaking. For those frames that include background speech when the user is not speaking, it is assumed that the background speech is much larger than the ambient noise. As such, any variance in the air conduction microphone signal during those frames is considered to be from the background speech. As a result, the variance $\sigma_v^2$ can be set directly from the values of the air conduction microphone signal during those frames when the user is not speaking but there is background speech.

At step 604, the frames identified where the user is not speaking but there is background speech are used to estimate the alternative sensor's channel response G for background speech. Specifically, G is determined as:

$$G = \frac{\sum_{t=1}^{D} (\sigma_u^2|B_t|^2 - \sigma_w^2|Y_t|^2) \pm \sqrt{\left(\sum_{t=1}^{D} (\sigma_u^2|B_t|^2 - \sigma_w^2|Y_t|^2)\right)^2 + 4\sigma_u^2\sigma_w^2\left|\sum_{t=1}^{D} B_t^* Y_t\right|^2}}{2\sigma_u^2 \sum_{t=1}^{D} B_t^* Y_t} \quad \text{Eq. 29}$$

Where D is the number of frames in which the user is not speaking but there is background speech. In Equation 29, it is assumed that G remains constant through all frames of the utterance and thus is no longer dependent on the time frame t.

At step 606, the value of the alternative sensor's channel response G to the background speech is used to determine the alternative sensor's channel response to the clean speech signal. Specifically, H is computed as:

$$H = G + \frac{\sum_{t=1}^{T} (\sigma_v^2|B_t - GY_t|^2 - \sigma_w^2|Y_t|^2) \pm \sqrt{\left(\sum_{t=1}^{T} (\sigma_v^2|B_t - GY_t|^2 - \sigma_w^2|Y_t|^2)\right)^2 + 4\sigma_v^2\sigma_w^2\left|\sum_{t=1}^{T} (B_t - GY_t)^* Y_t\right|^2}}{2\sigma_v^2 \sum_{t=1}^{T} (B_t - GY_t)^* Y_t} \quad \text{Eq. 30}$$

In Equation 30, the summation over T may be replaced with the recursive exponential decay calculation discussed above in connection with equations 15-24.

After H has been determined at step 606, Equation 28 may be used to determine a clean speech value for all of the frames. In using Equation 28, $H_t$ and $G_t$ are replaced with time independent values H and G, respectively. In addition, under some embodiments, the term $B_t - GY_t$ in Equation 28 is replaced with $$\left(1 - \frac{|GY_t|}{|B_t|}\right) B_t$$

because it has been found to be difficult to accurately determine the phase difference between the background speech and its leakage into the alternative sensor.

If the recursive exponential decay calculation is used in place of the summations in Equation 30, a separate value of $H_t$ may be determined for each time frame and may be used as $H_t$ in equation 28.

In a further extension of the above embodiment, it is possible to provide an estimate of the background speech signal at each time frame. In particular, once the clean speech value has been determined, the background speech value at each frame may be determined as:

$$V_t = \frac{1}{\sigma_w^2 + H^* G_u^2}[\sigma_w^2 Y_t + \sigma_u^2 H^* B_t - (\sigma_w^2 + |H|^2\sigma_u^2)X_t] \quad \text{Eq. 31}$$

This optional step is shown as step 610 in FIG. 6.

In the above embodiments, prior knowledge of the channel response of the alternative sensor to the clean speech signal has been ignored. In a further embodiment, this prior knowledge can be utilized, if provided, to generate an estimate of the channel response at each time frame $H_t$ and to determine the clean speech value $X_t$.

In this embodiment, the channel response to the background speech noise is once again assumed to be zero. Thus, the model of the air conduction signal and the alternative sensor signal is the same as the model shown in Equations 3 and 4 above.

Equations for estimating the clean speech value and the channel response $H_t$ at each time frame are determined by minimizing the objective function:

$$-\frac{1}{2\sigma_z^2}|Y_t - X_t|^2 - \frac{1}{2\sigma_w^2}|B_t - H_t X_t|^2 - \frac{1}{2\sigma_H^2}|H_t - H_0|^2 \quad \text{Eq. 32}$$

Figure 7:
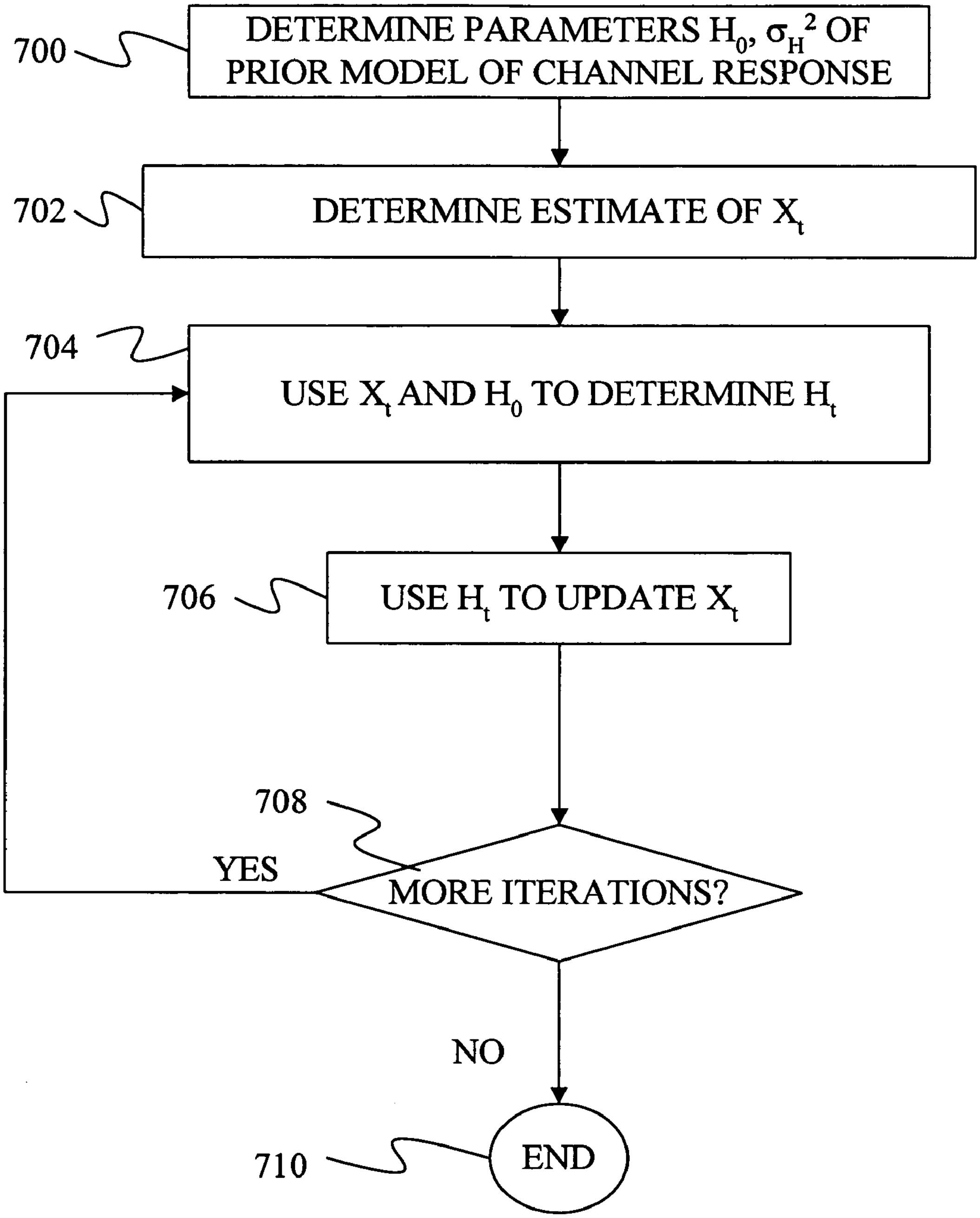
FIG. 7 is a flow diagram for enhancing speech under a further embodiment of the present invention.

This objective function is minimized with respect to $X_t$ and $H_t$ by taking the partial derivatives relative to these two variables independently and setting the results equal to zero. This provides the following equations for $X_t$ and $H_t$:

$$X_t = \frac{1}{\sigma_w^2 + \sigma_v^2|H_t|^2}(\sigma_w^2 Y_t + \sigma_v^2 H_t^* B_t) \quad \text{Eq. 33}$$

$$H_t = \frac{1}{\sigma_w^2 + \sigma_H^2|X_t|^2}(\sigma_H^2 B_t X_t^* + \sigma_w^2 H_0) \quad \text{Eq. 34}$$

Where $H_0$ and $\sigma_H^2$ are the mean and variance, respectively, of the prior model for the channel response of the alternative sensor to the clean speech signal. Because the equation for $X_t$ includes $H_t$ and the equation for $H_t$ includes the variable $X_t$, Equations 33 and 34 must be solved in an iterative manner. FIG. 7 provides a flow diagram for performing such an iteration.

In step 700 of FIG. 7, the parameters for the prior model for the channel response are determined. At step 702, an estimate of $X_t$ is determined. This estimate can be determined using either of the earlier embodiments described above in which the prior model of the channel response was ignored. At step 704, the parameters of the prior model and the initial estimate of $X_t$ are used to determine $H_t$ using Equation 34. $H_t$ is then used to update the clean speech values using Equation 33 at step 706. At step 708, the process determines if more iterations are desired. If more iterations are desired, the process returns to step 704 and updates the value of $H_t$ using the updated values of $X_t$ determined in step 706. Steps 704 and 706 are repeated until no more iterations are desired at step 708, at which point the process ends at step 710.

Although the present invention has been described with reference to particular embodiments, workers skilled in the art will recognize that changes may be made in form and detail without departing from the spirit and scope of the invention.

What is claimed is:

1. A method comprising:

for each time frame of a set of time frames, generating an alternative sensor value representing an alternative sensor signal using an alternative sensor other than an air conduction microphone;

for each time frame of the set of time frames, generating an air conduction microphone value;

identifying which frames in the set of frames do not contain speech from a speaker based on the energy level of the alternative sensor signal;

within the frames identified as not containing speech from the speaker, performing speech detection on the air conduction microphone values to determine which frames contain background speech and which frames do not contain background speech;

using alternative sensor values for the frames identified as not containing speech from the speaker and not containing background speech to determine a variance for noise of the alternative sensor;

using alternative sensor values and air conduction microphone values for the frames identified as not containing speech from the speaker but containing background speech to determine a channel response of the alternative sensor to background speech;

using the alternative sensor values and the air conduction microphone values for the set of time frames to estimate a value for a channel response of the alternative sensor to speech from the speaker; and using the channel response of the alternative sensor to speech from the speaker, the channel response of the alternative sensor to background speech, and the variance for noise of the alternative sensor to estimate a noise-reduced value for each time frame in the set of time frames.

2. The method of claim 1 wherein estimating a value for a channel response comprises finding an extreme of an objective function.

3. The method of claim 1 further comprising using the estimate of the noise-reduced value to estimate a value for a background speech signal produced by a background speaker.

4. The method of claim 1 wherein estimating a value for the channel response of the alternative sensor to speech from the speaker comprises estimating a single channel response value for all of the time frames in the set of time frames.

5. The method of claim 4 wherein estimating a noise-reduced value comprises estimating a separate noise-reduced value for each time frame in the set of time frames.

6. The method of claim 1 wherein estimating a value for a channel response of the alternative sensor to speech from the speaker comprises estimating the value for a current frame by weighting values for the alternative sensor signal and the air conduction microphone signal in the current frame more heavily than values for the alternative sensor signal and the air conduction microphone signal in a previous frame.

7. A computer-readable storage medium having stored thereon computer-executable instructions that when executed by a processor cause the processor to perform steps comprising:

receiving values for an alternative sensor signal and an air conduction microphone signal for each of a set of time frames, the air conduction microphone signal comprising speech from a speaker and noise;

determining a channel response for a channel from the speaker to an alternative sensor using the values for the entire set of time frames for the alternative sensor signal and the values for the entire set of time frames for the air conduction microphone signal using:

$$H = \frac{\sum_{t=1}^{T}(\sigma_z^2|B_t|^2 - \sigma_w^2|Y_t|^2) \pm \sqrt{\left(\sum_{t=1}^{T}(\sigma_z^2|B_t|^2 - \sigma_w^2|Y_t|^2)\right)^2 + 4\sigma_z^2\sigma_w^2\left|\sum_{t=1}^{T}B_t^*Y_t\right|^2}}{2\sigma_z^2\sum_{t=1}^{T}B_t^*Y_t}$$

where H is the channel response for a channel from the speaker to the alternative sensor, $B_t$ is value of the alternative sensor signal for time frame t, $B^*_t$ is the complex conjugate of $B_t$, $|B_t|$ is the magnitude of $B_t$, $Y_t$ is the value of the air conduction microphone signal for time frame t, $|Y_t|$ is the magnitude of $Y_t$, $\sigma_z^2$ is a variance for noise in the air conduction microphone signal, $\sigma_w^2$ is a variance for noise in the alternative sensor signal and T is the number of frames in the set of time frames; and using the channel response and a value for the alternative sensor signal for one time frame in the set of time frames to estimate a clean speech value for the time frame.

8. The computer-readable storage medium of claim 7 wherein the channel response comprises a channel response to a clean speech signal.

9. A method of identifying a clean speech signal, the method comprising:

using an alternative sensor signal from an alternative sensor other than an air conduction microphone to determine periods when a speaker is producing speech and periods when the speaker is not producing speech;

performing speech detection on portions of an air conduction microphone signal associated with the periods when the speaker is not producing speech to identify which portions of the periods are no-speech portions and which portions of the periods are background speech portions;

estimating a noise variance that describes noise in the alternative sensor signal during no-speech portions of the periods;

using the background speech portions of the alternative sensor signal to estimate a background speech channel response for a channel from a background speaker to the alternative sensor;

receiving values for the alternative sensor signal and the air conduction microphone signal for each of a set of time frames;

using the noise variance, the values for the alternative sensor signal for the set of time frames and the values for the air conduction microphone for the set of time frames to estimate a channel response for a channel representing a path from the speaker to an alternative sensor for at least one time frame in the set of time frames; and using the channel response and the background speech channel response to estimate a value for the clean speech signal for each time frame in the set of time frames that the channel response was estimated from.

10. The method of claim 9 further comprising using the no-speech portions to estimate noise parameters that describe noise in the air conduction microphone signal.

11. The method of claim 9 further comprising determining an estimate of a background speech value.

12. The method of claim 11 wherein determining an estimate of a background speech value comprises using the estimate of the clean speech value to estimate the background speech value.

13. The method of claim 9 further comprising using a prior model of the channel response to estimate the clean speech value.

* * * * *